(12) United States Patent
Yeh et al.

(10) Patent No.: US 6,478,328 B1
(45) Date of Patent: Nov. 12, 2002

(54) LOCKING DEVICE WITH SAFETY MECHANISM FOR COLLAPSIBLE STROLLER

(75) Inventors: Chuan-Ming Yeh; Cheng-Fan Yang, both of Taipei (TW)

(73) Assignee: Link Treasure Ltd., Tortola (VG)

( * ) Notice: Subject to any disclaimer, the term of this patent is extended or adjusted under 35 U.S.C. 154(b) by 79 days.

(21) Appl. No.: 09/699,417

(22) Filed: Oct. 31, 2000

(51) Int. Cl.[7] ............ B62B 1/00; A45C 13/00; A47B 95/02
(52) U.S. Cl. .......... 280/650; 280/647; 280/655.1; 280/658; 16/113.1; 190/115
(58) Field of Search ............ 280/639, 647, 280/649, 655, 655.1, 651, 657, 658, 47.371, 642; 16/113.1; 190/118, 18 A, 115, 117; 74/501.6, 526, 506, 108

(56) References Cited

U.S. PATENT DOCUMENTS

| | | | |
|---|---|---|---|
| 4,660,850 A | * | 4/1987 | Nakao et al. ............ 280/642 |
| 5,524,503 A | * | 6/1996 | Ishikura .................. 74/501.6 |
| 5,639,109 A | * | 6/1997 | Liang ..................... 280/655 |
| 5,709,400 A | * | 1/1998 | Bonnier et al. ......... 280/650 |
| 5,864,921 A | * | 2/1999 | Chou ....................... 16/115 |
| 6,129,373 A | * | 10/2000 | Cheng .................... 280/647 |
| 6,339,862 B1 | * | 1/2002 | Cheng .................... 16/113.1 |

FOREIGN PATENT DOCUMENTS

TW 389212 5/1988

* cited by examiner

*Primary Examiner*—Brian L. Johnson
*Assistant Examiner*—Gerald B Klebe
(74) *Attorney, Agent, or Firm*—Birch, Stewart, Kolasch & Birch, LLP

(57) ABSTRACT

A locking device for collapsable stroller is located at the gripping portion of handle. The locking device comprises a housing, a pair of meshed gear members in the housing pivotal in two different opposite directions, a push button engaged with gear members, and a pair of steel cables coupled to the gear members. Whereby, pressing a push button pulls steel cables toward the center of gripping portion, thereby unlocking the latches so as to unfold the stroller thereafter. The stroller further comprises a safety mechanism at the upper side of one gear member. Safety mechanism comprises a pawl-like member caught by the gear member in the locked state of the stroller, thus preventing latches from accidentally being unlocked.

8 Claims, 5 Drawing Sheets

LOCKING DEVICE WITH SAFETY MECHANISM FOR COLLAPSIBLE STROLLER

BACKGROUND OF THE INVENTION

1. Field of Invention

The present invention relates to strollers and more particularly to a locking device with an additional safety mechanism for collapsable stroller.

2. Related Art

A conventional locking device for a collapsable stroller is, for example, disclosed in Taiwanese Pat. Published No. 389,212. In collapsing the stroller, first rotate locking devices to move connecting rods up, thereby disengaging sliding blocks from catches. Then, user may collapse the stroller in this unlocked position.

But this is unsatisfactory for the purpose for which the invention is concerned for the following reasons:

1. The locking device is visually unattractive because it is projected from the stroller.
2. The collapsing operation is not simplified since, as stated above, it is required to rotate locking devices to move connecting rods up for disengaging sliding blocks from catches prior to bending user's back to collapse the stroller.
3. Connecting rod is movable. Also, a gap may exist between connecting rod and stroller frame while collapsing the stroller. As such, it is possible to hurt user if hands are accidentally put into the gap.

Thus, it is desirable to provide an improved locking device with an additional safety mechanism for collapsable stroller in order to overcome the above drawbacks of prior art.

SUMMARY OF THE INVENTION

It is therefore an object of the present invention to provide a locking device for collapsable stroller whereby press pushing portion and thus engagement portion of push button pivot two gear members in two different opposite directions such that two coupled steel cables are pulled toward the center of gripping portion, thereby unlocking the latches so as to unfold the stroller thereafter.

It is another object of the present invention to provide a locking device for collapsable stroller. The stroller further comprises a safety mechanism at the upper side of one gear member. Safety mechanism comprises a pawl-like member caught by the gear member in the locked state of the stroller, thus preventing latches from accidentally being unlocked.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
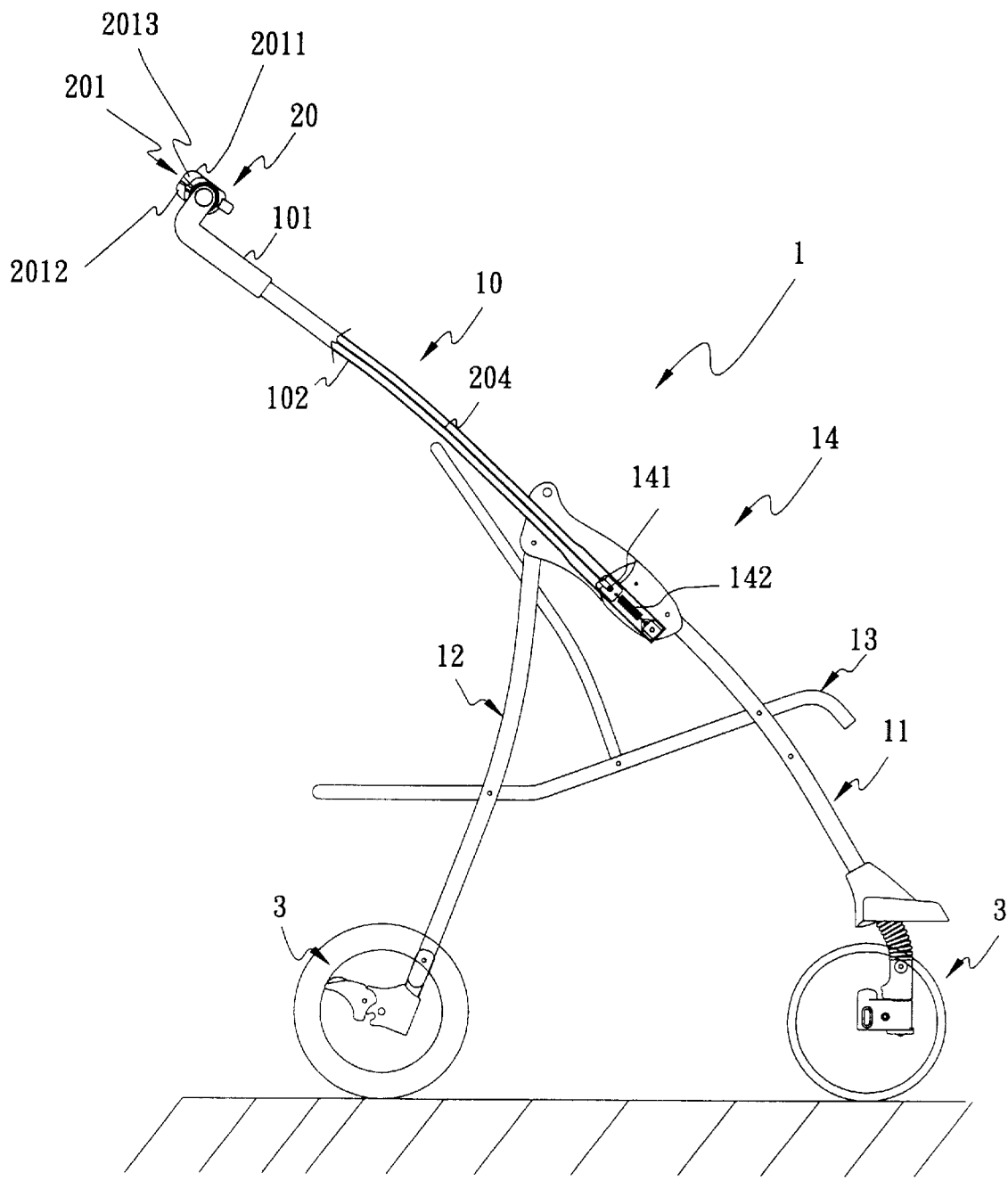
FIG. 1 is a schematic side view of the unfolded frame of a collapsable stroller incorporating the locking device with safety mechanism according to the invention.
Figure 5:
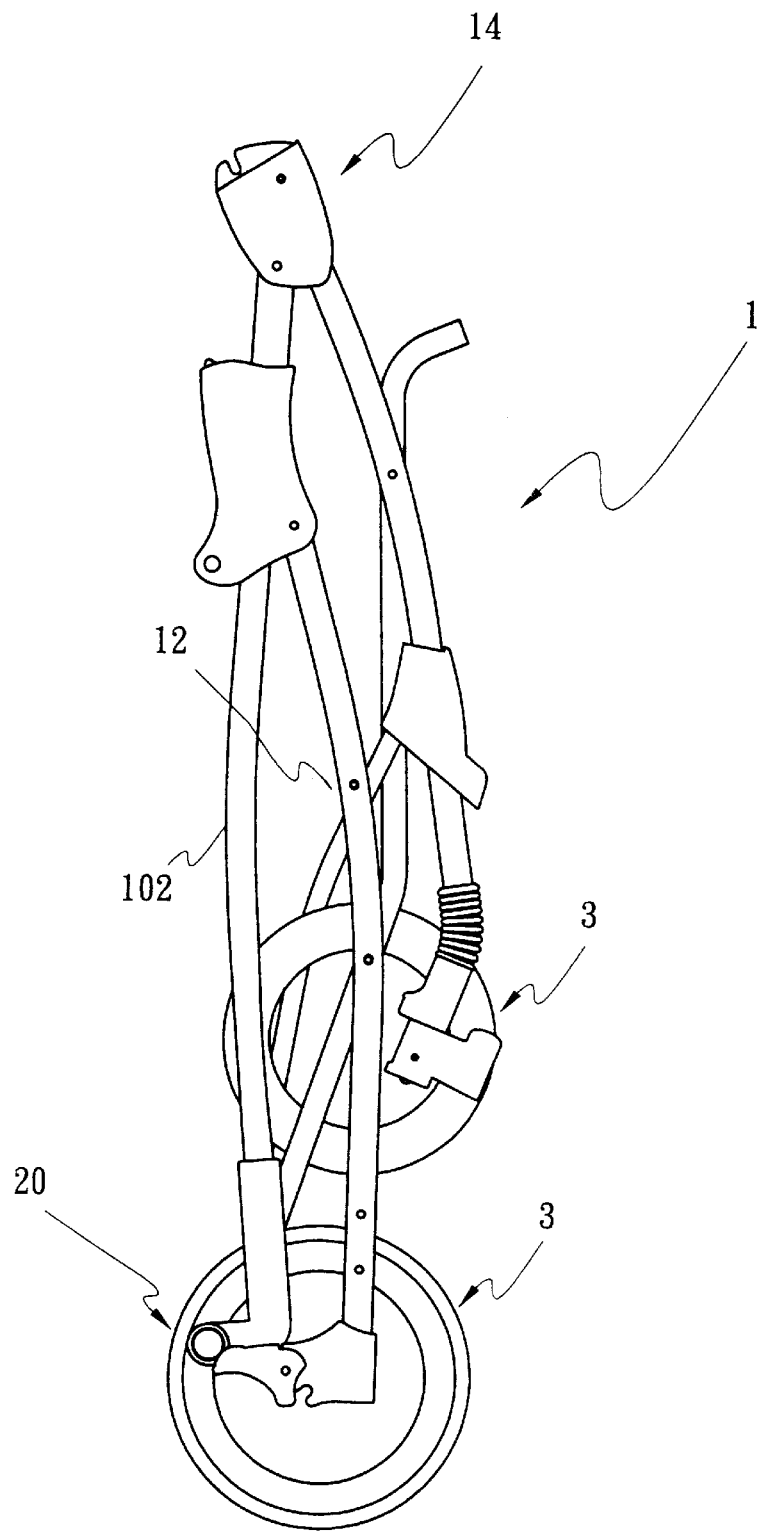
FIG. 5 is a schematic side view of the collapsed stroller frame shown in FIG. 1.

Referring to the drawings and particularly FIG. 1, there is shown a collapsable stroller constructed in accordance with the invention comprising a frame 1 and a plurality of sets of wheels 3 rotatably mounted under the frame 1. The frame comprises a handle 10, front legs 11, rear legs 12, seat tubes 13, latches 14, and a locking device 20. Handle 14 comprises a gripping portion 101 and two arms 102. Latch 14 comprises a latch pin 141 and a helical spring 142. User may manipulate locking device 20 to control the locking or unlocking of latch pin 141 for unfolding the stroller in a use position as shown in FIG. 1 or folding the stroller in a storage position as shown in FIG. 5.

Figure 2:
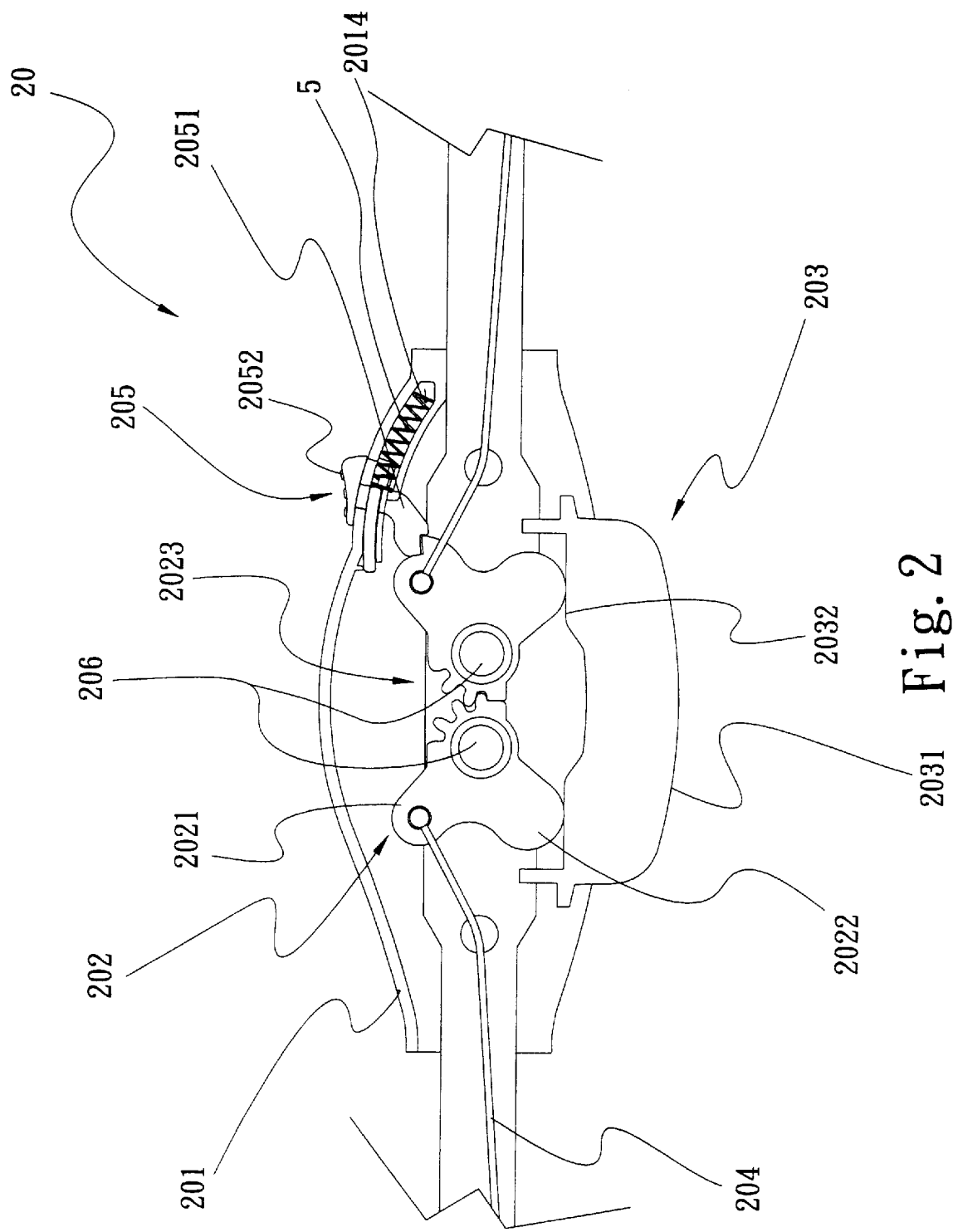
FIG. 2 schematically shows the components of locking device and safety mechanism of the FIG. I stroller.
Figure 3:
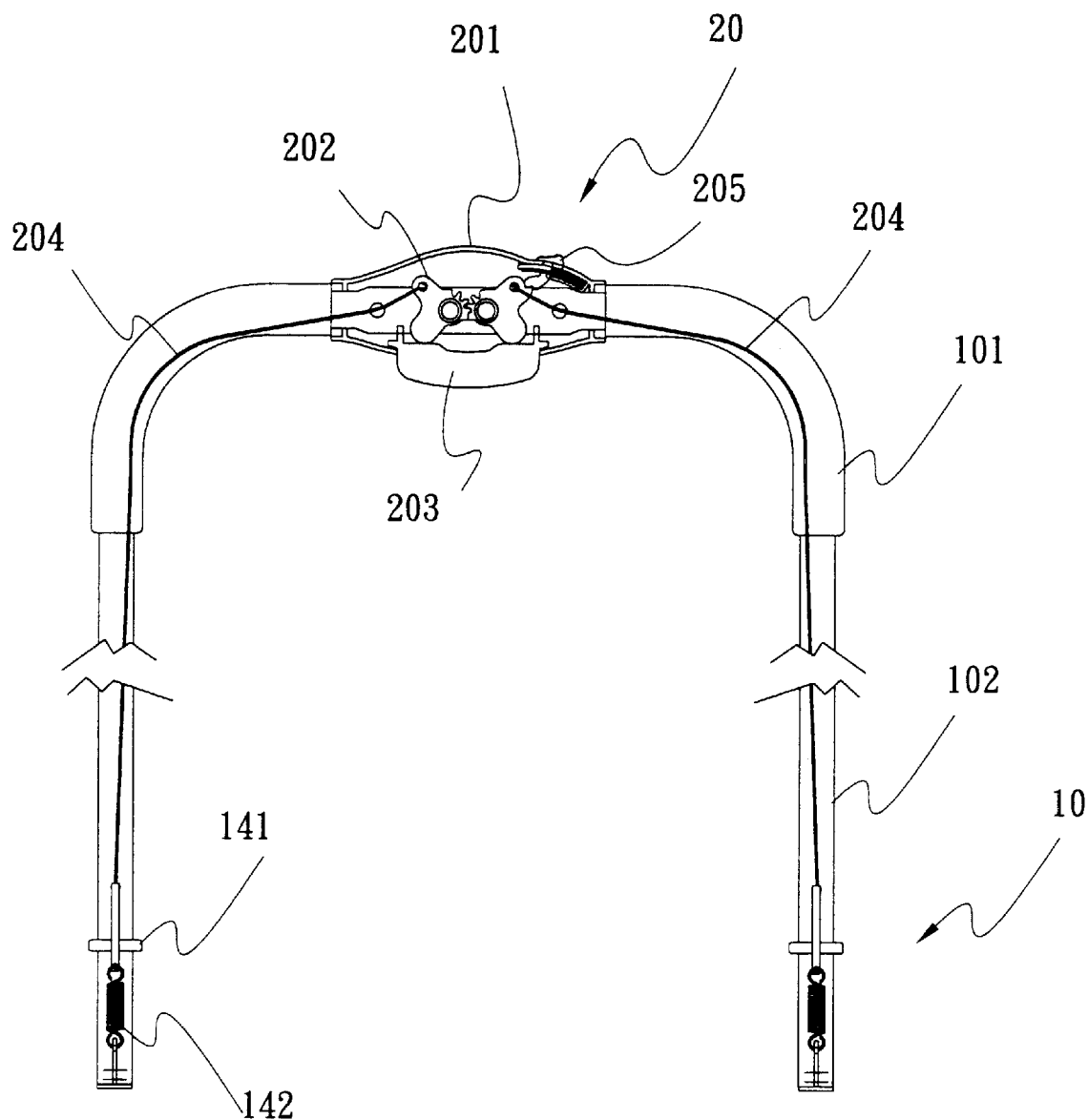
FIG. 3 is a schematic plan view of the handlebar portion including locking device and safety mechanism of FIG. 2.

Referring to FIGS. 2 and 3 specifically, locking device 20 located at the gripping portion 101 of the handle 10 comprises a housing 201, a pair of opposite gear members 202, a push button 203, a pair of steel cables 204, and a safety mechanism 205. Housing 201 comprises an upper portion 2011, a lower portion 2012, and a space 2013 enclosed by portions 2011 and 2012. Each gear member 202 is pivotably connected to gripping portion 101 of handle 10. One gear member 202 comprises a first projection 2021 coupled to one end of steel cable 204, a second projection 2022 engaged with push button 203, and a gear section 2023 meshed with that of the other gear member 202. Push button 203 comprises a projected pushing portion 2031 and an engagement portion 2032. Push button 203 is located at the underside of gear members 202. Push button 203 is slidable in housing 201.

Figure 4:
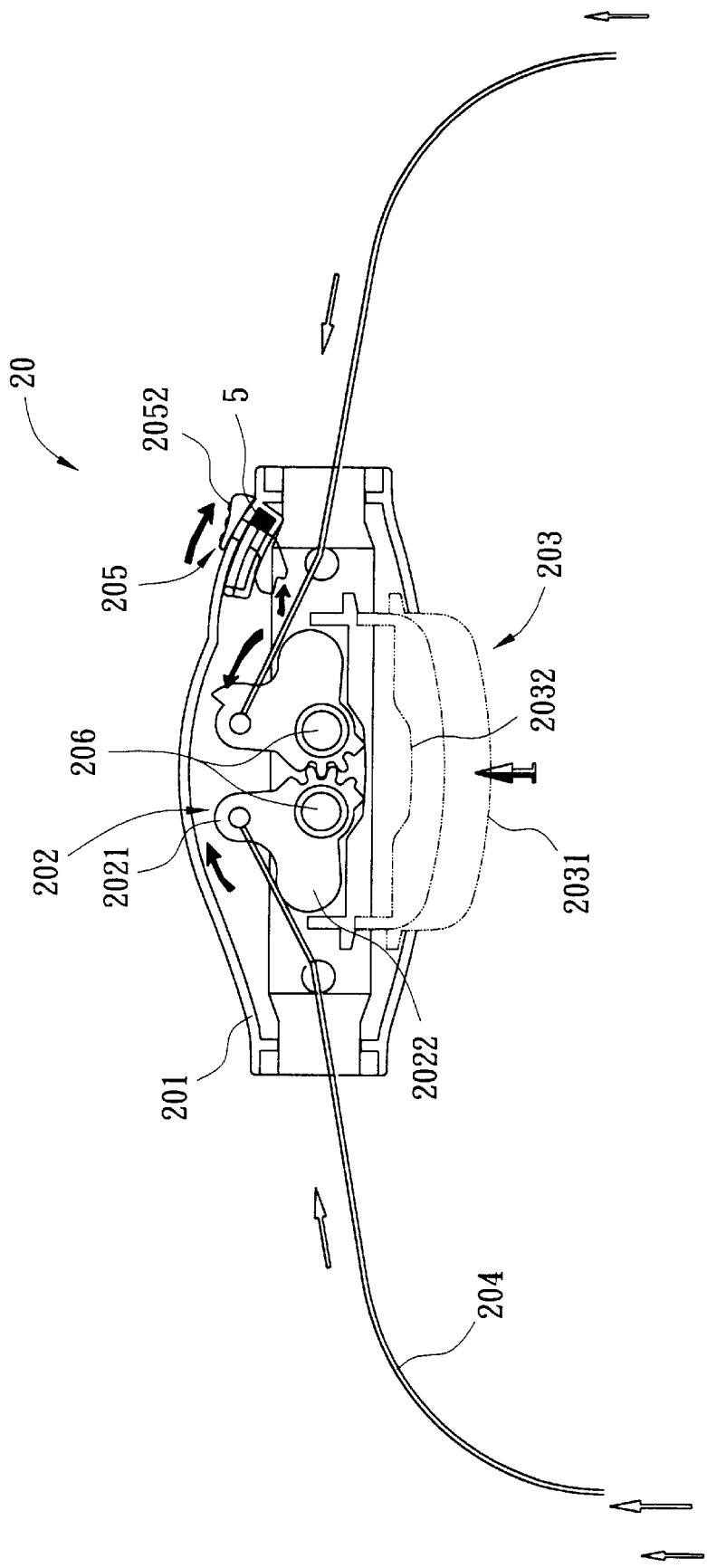
FIG. 4 schematically shows the unlocking operation of the locking device and safety mechanism of FIG. 2.

Referring to FIGS. 3 and 4 specifically, the operation of locking device 20 will now be described. As shown, press pushing portion 2031 (and thus engagement portion 2032) of push button 203 to cause second projection 2022 of gear members 202 to pivot. Next, one gear section 2023 is pivoted in one direction (e.g., clockwise), while the other meshed gear section 2023 is pivoted in an opposite direction (e.g., counterclockwise). As such, two steel cables 204 are pulled toward each other (i.e., toward the center of gripping portion 101. At the same time, latch pins 141 coupled to the other ends of steel cables 204 are activated for unlocking the latches 14 in response to the pulling movement of steel cables 204. Thus, user may fold the stroller. In unfolding the stroller, springs 142 in the arms 102 are expanded to return to original unbiased state for causing push button 203 and gear members 202 to return to their positions in the locked state of stroller.

Referring to FIG. 4 specifically, an additional safety mechanism 205 is slidably mounted on the housing 201 for preventing latch pins 141 from accidentally unlocked. Safety mechanism 205 comprises an internal spring 5 biased in a receptacle 2014, a pawl-like member 2051, and a projected pushing portion 2052. In the locked position, pawl-like member 2051 of safety mechanism 205 is caught by first projection 2021 of gear member 202, thus inhibiting the pivotal movement of gear member 202 and disabling push button 203. In contrast in collapsing the stroller, first push pushing portion 2052 to disengage pawl-like member 2051 from first projection 2021. Whereby gear member 202 is free to pivot by pressing push button 203 downward with respect to housing 201. Finally, user is allowed to fold the stroller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A locking device in cooperation with a pair of latches on a collapsible stroller, the stroller including a frame having a handle and a plurality of sets of wheels rotatably mounted under the frame, the locking device located at the handle of the stroller, the locking device comprising:

a housing including a receiving space;

a push button including a projected pushing portion and an engagement portion, the push button being slidable in the housing;

a pair of steel cables each having one end coupled to the locking device and the other end coupled to the latch;

a pair of gear members pivotably connected to the handle, each of the gear members including a first projection coupled to one end of each steel cable, a second projection engaged with the push button, and a gear section meshed with that of the other gear member; and a safety mechanism slidably mounted on the housing, the safety mechanism including a pawl-like member being caught by the first projection of one of the gear members for inhibiting the pivotal movement of the gear members and disabling the push button in a locked position of the stroller and the projected pushing portion, whereby pushing the pushing portion of the safety mechanism disengages the pawl-like member from the first projection of one of the gear members, and pressing the pushing button toward the inside of the housing pivots the gear sections and the gear members in two different opposite directions for pulling the steel cables toward the center of the handle.

2. The locking device of claim 1, wherein the frame further comprises a plurality of front legs and a plurality of rear legs.

3. The locking device of claim 2, wherein the handle comprises a gripping portion and two arms.

4. The locking device of claim 1, wherein each latch comprises a latch pin and a spring.

5. The locking device of claim 1, wherein the housing further comprises an upper portion and a lower portion.

6. The locking device of claim 1, wherein the gear members are opposite and pivotably connected to the handle.

7. The locking device of claim 1, wherein the safety mechanism further comprises a receptacle recessed on the housing.

8. The locking device of claim 7, wherein the safety mechanism further comprises an elastic member biased in the receptacle.

* * * * *